May 12, 1942.　　　S. MILLER　　　2,282,669
GLIDER
Filed Aug. 16, 1940　　　2 Sheets-Sheet 1
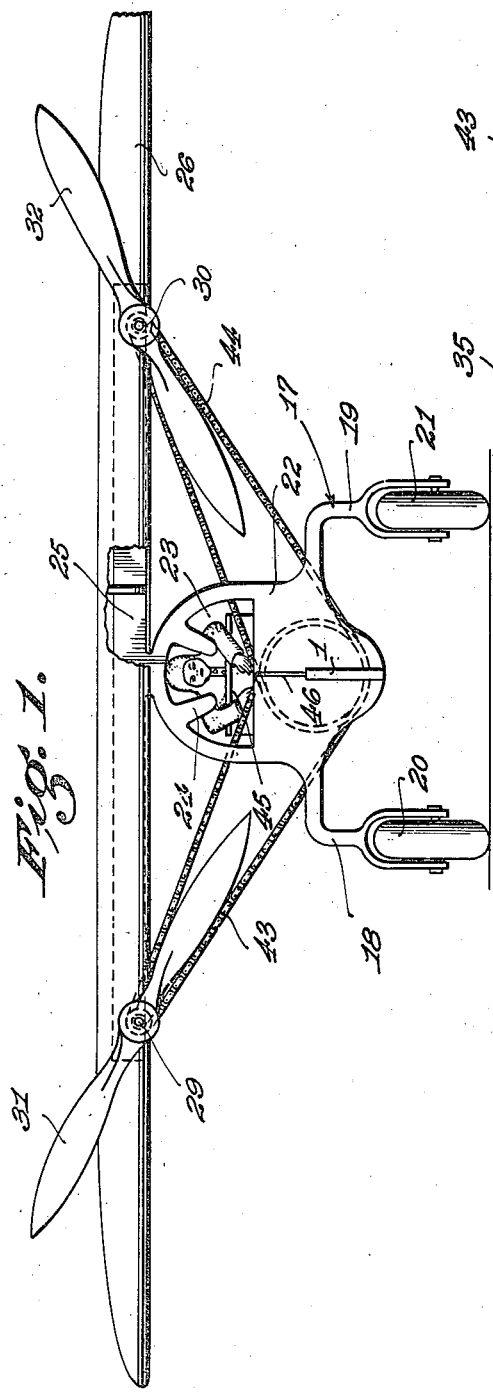
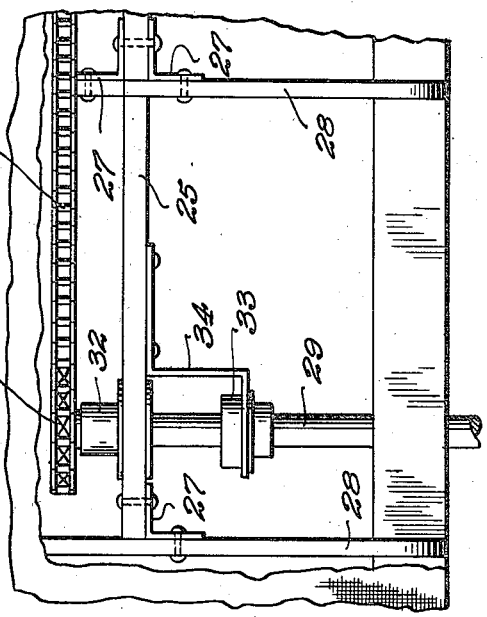
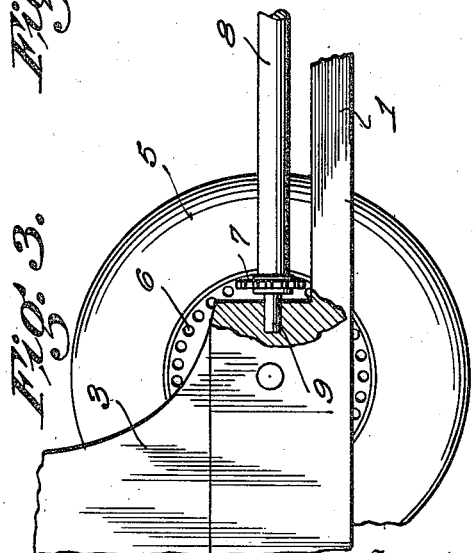
Inventor
Stephen Miller May 12, 1942.   S. MILLER   2,282,669
GLIDER
Filed Aug. 16, 1940   2 Sheets-Sheet 2
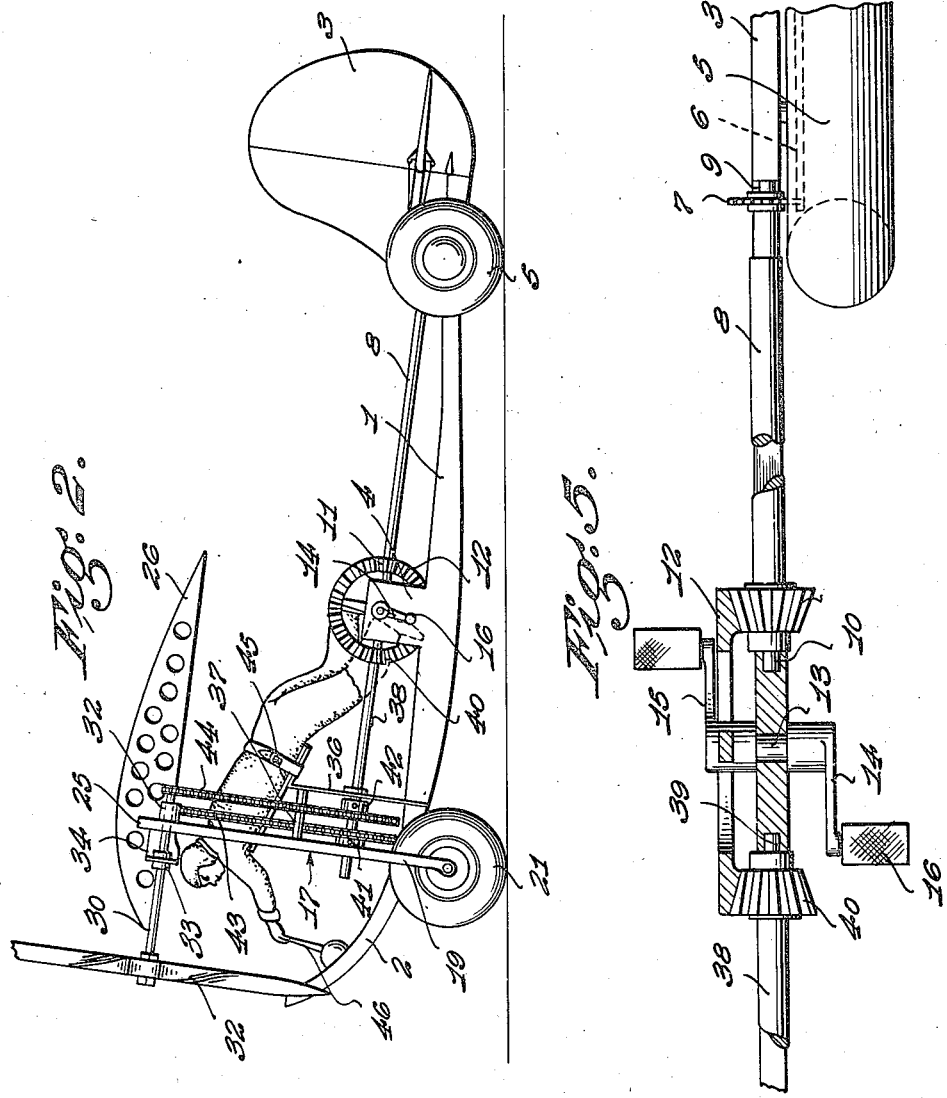
Inventor
Stephen Miller
By Lacey & Lacey, Attorneys Patented May 12, 1942

2,282,669

UNITED STATES PATENT OFFICE 2,282,669

GLIDER

Stephen Miller, New York, N. Y.

Application August 16, 1940, Serial No. 352,964

1 Claim. (Cl. 244—64)

This invention relates to aircraft and more particularly to an improved glider.

One object of the invention is to provide a glider having propulsion means operable by the pilot, said propulsion means assisting in keeping the machine in the air after taking off.

Another object of the invention is to provide a glider employing a tail wheel operatively connected with the propulsion means for assisting the machine in taking off.

A further object of the invention is to provide an aircraft of this character which is so constructed that the pilot will be accommodated in a prone position, with the result that he will be enabled to exert the effort necessary to drive the propulsion means, in a plane parallel with the fuselage so that the balance of the machine will not be disturbed by operation of said propulsion means.

Another object of the invention is to provide a glider which may be constructed in a size for use as a toy or in full size for use by gliding enthusiasts.

And still another object of the invention is to provide a glider, the fuselage of which employs a frame which provides mounting means for landing, wheels, supporting means for the wing employed, and partially supports the propulsion means.

The foregoing and other objects of the invention will become apparent during the course of the following description.

In the drawings forming a part of my invention:

Figure 1 is a front elevation of my improved glider,

Figure 2 is a side elevation of the machine, and showing particularly the propulsion means, Figure 3 is an enlarged detail plan view showing the tail wheel mounting, the view being partly in section in order to show the supporting means for the tail wheel drive shaft, Figure 4 is an enlarged detail plan view of the wing, the wing fabric being partially broken away in order to show one of the air screw shaft mountings and the connection between said shaft and one of the propulsion chains employed, and Figure 5 is an enlarged top plan view, partly in section, and showing particularly the propulsion gears.

Referring now more particularly to the drawings, wherein like numerals of reference indicate like parts throughout the various views, the numeral 1 indicates the fuselage of my improved glider. The fuselage 1 is formed with an upwardly curved forward end portion 2 and a tail assembly 3. The tail assembly, or empennage, is of conventional construction and, of course, includes the usual rudder and elevators. Formed medially of the length of the fuselage is an upwardly extending mounting 4, the purpose for which will be described more in detail hereinafter.

Mounted on the fuselage 1 adjacent the tail assembly is a tail wheel 5. As best seen in Figure 3 of the drawings, the tail wheel 5 is provided with a circumferential series of openings which define a driven gear 6 which driven gear meshes with a driving pinion 7. The driving pinion 7 is mounted on a tail wheel drive shaft 8, near the rear end thereof. The shaft 8 is formed with a reduced rear end portion 9 which is journaled by the tail assembly 3. At its forward end, the shaft 8 is provided with a reduced shank 10 which is journaled by the mounting 4. A driven propulsion gear 11, which is beveled, is mounted on the shaft 8 to turn therewith.

Rotatably positioned on the mounting 4 and meshing with the driven propulsion gear 11 is a drive propulsion gear 12. The gear 12 is mounted on a crank shaft 13, which extends through the mounting 4, to turn therewith. Cranks 14 and 15 are fixed to the shaft 13 to turn therewith, and each of said cranks carries a pedal 16 at its free end.

A frame 17 is fixed to the fuselage near its forward end. As seen in Figure 1 of the drawings, the frame is of one piece construction, and extends in a plane at right angles to that of the fuselage. The frame 17 is formed with wheel mounting yokes 18 and 19 which mount landing wheels 20 and 21. The frame also is formed with a body 22 which has an opening 23 therein, said opening extending throughout most of the area of the upper part of the body and being of semi-circular contour. Extending downwardly into the opening are shoulder braces 24.

The frame 17 has a wing supporting bar 25 formed thereon, said bar being integrally connected with the upper end of the body 22 and extending laterally at opposite sides thereof. The bar 25 supports a wing 26 and effectually connects the wing to the frame. By referring particularly to Figure 4 of the drawings, it will be seen that the wing supporting bar 25 is connected to the wing 26 by means of brackets 27 which are bolted to said bar and to bows 28 of the frame of the wing.

The wing supporting bar 25 also provides means for operatively supporting air screw, or propeller, shafts 29 and 30, one of said shafts being rotatably mounted near each end of the said bar 25. Air screws 31 and 32 are mounted on the shafts 29 and 30, respectively. As clearly seen in Figure 4, two bearings are employed for mounting each of the shafts 29 and 30. One of said bearings is shown at 32, and is mounted in the bar 25 itself, while the other of said bearings, indicated at 33, is mounted on a bracket 34 which is secured to the face of said bar 25.

Each of the shafts 29 and 30 has fixed to its inner end a driven gear 35.

Associated with the frame 17 is a sub-frame 36. The sub-frame 36 is mounted on the fuselage 1 rearwardly of the frame 17 and in spaced relation thereto, and said sub-frame has its upper end connected to said frame by a spacer bar 37. A drive shaft 38 has its forward end extending through the frames 17 and 36 and journaled thereby. The drive shaft 38 has its rear end portion reduced, as shown at 39, and said reduced portion is journaled by the mounting 4. A driven propulsion gear 40, similar to the gear 11, is fixed to the drive shaft 38 to turn therewith and, like the gear 11, meshes with the propulsion drive gear 12.

In order to transmit rotative movement to the air screw shafts 29 and 30, I employ driving gears 41 and 42 which are fixedly mounted on the drive shaft 38 between the frame 17 and the sub-frame 36. Propulsion chains 43 and 44 are trained about the gears 41 and 42 and about the gears 35 on the shafts 29 and 30, respectively.

As seen best in Figure 2, the sub-frame 36 is turned rearwardly and obliquely downwardly to receive the rear end portion of a supporting plate 45. The plate 45 extends obliquely upwardly and has its upper and forward end extending into the opening 23. As seen in Figures 1 and 2, the plate 45 supports a pilot in a prone position. In this position he may conveniently engage the rudder and elevator control, shown at 46, and may also operate the propulsion mechanism.

The operation of the invention would seem obvious from the foregoing description. A brief description thereof would, however, not be out of place. At this point, it is desired to state that my improved glider may be manufactured in miniature, for use as a toy, or may be made in full size. In this description of operation, it is assumed that the device is full size. The pilot first straps himself to the plate 45, in prone position. He engages his hands with the rudder and elevator control 46 and his feet with the pedals 16. His shoulders are engaged against the shoulder braces 24. He then moves his legs for rotating the propulsion drive gear 12. This rotative movement is transmitted through the shaft 8 to the tail wheel for causing rotation thereof and consequent movement of the glider. The movement imparted to the glider by rotation of the tail wheel will assist in causing said glider to "take off."

The rotation of the gear will, of course, simultaneously rotate the drive shaft 38. Rotation of the shaft 38 will, of course, cause rotation of the gears 41 and 42 and also, through consequent movement of the chains 43 and 44, the air screw shafts 29 and 30, with the air screws 31 and 32 thereon. Rotation of the air screws will aid in maintaining the glider in the air.

It is a particularly noteworthy feature of the invention that, inasmuch as the pilot lies in a prone position, he will be able to exert his full strength in a direction lengthwise of the fuselage with the result that danger of disturbance of the balance, such as might be caused if propelling force were exerted at right angles to the length of the fuselage, will be avoided.

Attention is directed to the fact that, if desired, clutches may be inserted between the ends of the shafts 8 and 38 so that either the tail wheel or the air screws may be rendered inoperative.

Having thus described the invention, what is claimed as new is:

A glider including a fuselage, sustaining wing and tail assembly, a main frame disposed in an upright position at the front of the glider and having its lower portion solid and its upper end connected with the sustaining wing and formed with a substantially semi-circular opening, radiating shoulder braces projecting inwardly from the upper wall of said opening, a control device mounted on the fuselage in front of the main frame, an auxiliary frame secured to and spaced rearwardly from the main frame and having its upper end provided with a downwardly and rearwardly inclined extension, a supporting plate secured to said extension and having its forward end projecting through the opening in the main frame to form an inclined rest for supporting the body of the pilot, forward wheels mounted on the main frame, rear wheels forming a part of the tail assembly, a propulsion shaft operatively connected with the rear wheels, propellers mounted on the wing, means for transmitting motion from the propulsion shaft to said propellers, and foot pedals operatively connected with the propulsion shaft, the space between the main frame and forward end of the fuselage being unobstructed thereby to permit the shoulders of the pilot to project through said opening and contact with the radial shoulder braces and the body of the pilot to assume an inclined position for operating the control device and said foot pedals.

STEPHEN MILLER.